United States Patent
Berghaus et al.

(10) Patent No.: US 6,244,103 B1
(45) Date of Patent: Jun. 12, 2001

(54) INTERPOLATED HEIGHT DETERMINATION IN AN ATOMIC FORCE MICROSCOPE

(75) Inventors: Andreas Berghaus, San Francisco; Charles E. Bryson, III, Santa Clara; John J. Plombon, San Francisco, all of CA (US)

(73) Assignee: Surface/Interface, Inc., Sunnyvale, CA (US)

( * ) Notice: Subject to any disclaimer, the term of this patent is extended or adjusted under 35 U.S.C. 154(b) by 0 days.

(21) Appl. No.: 09/465,494

(22) Filed: Dec. 16, 1999

(51) Int. Cl.[7] .................................................. G01B 21/30
(52) U.S. Cl. ............................. 73/105; 250/306; 250/307
(58) Field of Search ............................... 73/105; 250/306, 250/307

(56) References Cited

U.S. PATENT DOCUMENTS

| | | | |
|---|---|---|---|
| 5,237,859 | 8/1993 | Elings et al. ............................ | 73/105 |
| 5,307,693 | 5/1994 | Griffith et al. ...................... | 73/862.68 |
| 5,329,808 * | 7/1994 | Elings et al. ............................ | 73/105 |
| 5,400,647 * | 3/1995 | Elings ................................... | 73/105 |
| 5,477,732 * | 12/1995 | Yasue et al. ........................... | 73/105 |
| 5,557,156 | 9/1996 | Elings .................................. | 310/316 |
| 5,756,887 | 5/1998 | Bryson, II et al. ..................... | 73/105 |
| 5,801,381 * | 9/1998 | Flecha et al. ........................ | 250/306 |

* cited by examiner

Primary Examiner—Hezron Williams
Assistant Examiner—Michael Cygan
(74) Attorney, Agent, or Firm—Charles S. Guenzer

(57) ABSTRACT

A method and apparatus associated with an atomic force microscope (AFM) to more accurately measure the height of a microscopic feature in a substrate, particularly one having a sloping face. The probe tip is sequentially positioned at a number of vertical positions approaching the surface being probed. At each vertical position, a vertical force encountered by the probe tip is measured, and the measured force is stored in a memory together with its corresponding vertical position. When the measured force exceeds a threshold force, the downward movement is stopped, and the accumulated force and position data are analyzed. A controller fits the data to two curves, for example, two linear relationships in force vs. height. One curve is associated with the lower forces away from the surface, the other curve with the higher forces after initial engagement with the surface. The intersection of the two curves gives the height of the feature in the surface.

12 Claims, 5 Drawing Sheets

INTERPOLATED HEIGHT DETERMINATION IN AN ATOMIC FORCE MICROSCOPE

FIELD OF THE INVENTION

The invention relates generally to profilometers or atomic force microscopes. In particular, the invention relates to increasing the accuracy of such probes in determining the height of a feature.

BACKGROUND OF THE INVENTION

In semiconductor fabrication and related technologies, it has become necessary to routinely determine critical dimensions (CD) of physical features, usually in the horizontal dimension, formed in substrates. An example, shown in the illustrative cross sectional view of FIG. 1, includes a trench 10 formed in a substrate 12, such as a silicon wafer. The illustration greatly exaggerates the depth of the trench 10 relative to the thickness of a silicon wafer 12, but the illustrated aspect ratio of the trench 10 is realistic. In advanced silicon technology, the width of the trench may be 0.18 µm; and its depth, 0.7 µm. The critical dimension of the trench 10 may be the width of the top of the trench opening or may be the width of the bottom of the trench 10. In other situations, the depth of the trench 10 is an important parameter. For the dimensions described above, the trench 10 has a high aspect ratio of greater than 4. Although typically sidewalls 14 of the trench 10 have ideal vertical profile angles of 90°, in fact the profile angle may be substantially less. Much effort has been expended in keeping the profile angle at greater than 85° or even 88° to 90°, but it requires constant monitoring of the system performance to guarantee that such a sharp trench is etched, and substantially lesser angles may be observed if sharp trenches are not required or the process has fallen out of specification. As a result, it has become necessary, either in the development laboratory or on the production line, to measure the profile of the trench 10 with horizontal resolutions of 0.18 µm or even substantially less. Depending upon the situation, the entire profile needs to be determined, or the top or bottom trench width needs to be measured. In other situations, not directly described here, the trench depth may be the critical dimension. More circular apertures, such as needed for inter-level vias, also need similar measurements. Similar requirements extend to measuring the profiles of vertically convex features such as interconnects.

To satisfy these requirements, profilometers based upon atomic force microscopy (AFM) and similar technology have been developed which rely upon the vertical position of a probe tip 20, illustrated in FIG. 1, to measure critical dimension down to the order of tens to hundreds of nanometers. In the past, the probe tip 20 has assumed the form of a conical tip having atomically sized tip dimensions. Such a conical tip has difficulty reaching the bottom of a sharply sloping trench. More recently developed probe tips have a cylindrically or approximately square shaped cross sections of dimensions of 0.2 µm or less. Such a small probe tip is relatively short, of the order of micrometers, and is supported on its proximal end by a more massive tip support.

In the pixel mode of operation, the probe tip 20 is discontinuously scanned horizontally along a line. At multiple positions, which are typically periodically spaced but non-periodic spacing is possible, the horizontal scan of the probe tip 20 is stopped, and it is gently lowered until it is stopped by the surface of the substrate 12. Circuitry to be briefly described later measures the height at which the probe tip stops. A series of such measurements around the feature being probed, for example, on either side of and within the trench 10, provides a profile or topography of the sample.

In the related jumping mode of operation, the probe tip is continuously scanned while it is being lowered to the surface. Once the surface has been encountered, the vertical position of the probe tip is measured, and the tip is then raised during a continuation of the horizontal scan.

An example of such a critical dimension measurement tool is the Model JGCDM-12S available from Surface/Interface, Inc. of Sunnyvale, Calif. It employs technology similar to the rocking balanced beam probe disclosed by Griffith et al. in U.S. Pat. No. 5,307,693 and by Bryson et al. in U.S. Pat. No. 5,756,887. It is particularly useful in the above described pixel mode of operation. The tool is schematically illustrated in the side view of FIG. 2. A wafer 30 or other sample to be profiled is supported on a support surface 32 supported successively on a tilt stage 34, an x-slide 36, and a y-slide 38, all of which are movable about their respective axes so as to provide two-dimensional and tilt control of the wafer 30. Although these mechanical stages provide a relatively great range of motion, their resolutions are relatively course compared to the resolution sought in the probing. The bottom-slide 38 rests on a heavy granite slab 40 providing vibrational stability. A gantry 42 is supported on the granite slab 40. A probe head 44 depends from the gantry 42 through an intermediate piezoelectric actuator providing about 10 µm of motion in (x, y, z). The piezoelectric actuator typically is a thin walled piezoelectric cylinder having separate x-, y-, and z-electrodes attached to the wall of the cylinder to thereby effect separately controlled movement along the three axes. A probe tip 46 projects downwardly from the probe head 44 to selectively engage the top surface of the wafer 30 and to determine its vertical and horizontal dimensions.

Principal parts of the probe head 44 of FIG. 2 are illustrated in orthogonally arranged side views in FIGS. 3 and 4. A dielectric support 50 fixed to the bottom of the piezoelectric actuator 45 includes on its top side, with respect to the view of FIG. 2, a magnet 52. On the bottom of the dielectric support 50 are deposited two isolated capacitor plates 54, 56 and two interconnected contact pads 58, which may be a single long film running between the capacitor pads 54, 56.

A beam 60 is medially fixed on its two lateral sides and electrically connected to two metallic and ferromagnetic ball bearings 62, 64. The beam 60 is preferably composed of heavily doped silicon so as to be electrically conductive, and a thin silver layer is deposited on it to make good electrical contacts to the ball bearings. However, the structure may be more complex as long as the upper surface of the beam 60 is electrically conductive in the areas of the ball bearings 62, 64 and of the capacitor plates 54, 56. The ball bearings 62, 64 are placed on the contact pads 58 and generally between the capacitor plates 54, 56, and the magnet 52 holds the ferromagnetic bearings 62, 64 there. The attached beam 60 is held in a position generally parallel to the dielectric support 50 with a balanced vertical gap 66 of about 25 µm between the capacitor plates 54, 56 and the beam 60 that allows a rocking motion of the 25 µm. Two capacitors are formed between the respective capacitor pads 54, 56 and the conductive beam 60. The capacitor pads 54, 56 and the contact pads 58, electrically connected to the conductive beam 60, are connected to three terminals of external measurement and control circuitry to be described later. The beam 60 holds on its distal end a glass tab 70 to which is fixed a stylus 72 having the probe tip 20 projecting downwardly to selectively engage the top of the wafer 12 being probed. An unillustrated dummy stylus or substitute weight on the other end of the beam 60 provides rough mechanical balancing of the beam in the neutral position.

Three unillustrated electrical lines connect the two capacitor plates 54, 56 and the contact pads 58 to a servo system that both measures the two capacitances and applies differential voltage to the two capacitor pads 54, 56 to keep them in the balanced position. When the piezoelectric actuator 45 lowers the stylus 72 to the point that it encounters the feature being probed, the beam 60 rocks upon contact of the stylus 72 with the wafer 30. The difference in capacitance between the plates 54, 56 is detected, and the piezoelectric actuator 45 withdraws until the capacitance is again equal.

In practice, the determination of the depth (height) of the feature is not so straightforward. Because of electronic noise and the elasticity of both the probing tip and the underlying feature, there is no clear point at which the probe first touches the substrate being probed. For these reasons, it is typical to set a minimum threshold force experienced by the probe at which contact with the underlying feature is established. Such thresholding usually works effectively in the situation in which the probe tip encounters a planar surface because after initial contact, assumed to produce zero force, the force increases very rapidly with continuing downward movement of the probe tip. Solid materials exhibit a high Young's modulus (force vs. compression), that is, they are rigid, and even narrow probe tips exhibit reasonably high rigidity in the vertical direction.

More conventional probe have pyramidal tips with atomically sized tip ends. The typical forces encountered, which are in the range of 10 to 1000 nN, are insufficient to significantly deform or deflect such a tip. However, the situation becomes more complex when, as illustrated schematically in cross section in FIG. 5, a narrow probe tip 20 encounters the sloping sidewall 14. The probe tip 20 may physically encounter the sloping sidewall 14 at a point 80; but, because the probe tip 20 is relatively flexible in the lateral direction, the oblique force exerted on it causes it to bend with the slope of the wall 14 as the tip is further lowered. The flexing problem is intensified by the recently developed very narrow and long probes having diameters of about 10 nm and lengths of about 1 $\mu$m because the lateral stiffness of a rod-like probe varies with the fourth power of the probe diameter. Other portions of the apparatus may also move in reaction to the lateral force imparted by the sloping sidewall 14. As a result, the force encountered after initial contact does not increase as quickly as if the encountered surface were planar. The threshold thus may not be exceeded until the probe tip is lowered to a point 82 significantly lower down the sidewall 14. This results in a false measurement of the depth of the sidewall 80 at the original horizontal position of the probe tip 20, or alternatively a false measurement of the horizontal position for such a sidewall depth.

An example of such a depth dependent force experienced by the probe is illustrated in the schematic graph of FIG. 6. As the probe is lowered toward the substrate, there is a substantially constant force signal being observed (the zero point usually being an experimental artifice), as represented by trace 90. The low-force trace 90 is generally flat but substantial noise about a flat response is expected. It is possible that the low-force trace 90 has a linear dependence, either increasing or decreasing slightly, because of instrumental errors. At some point, the probe encounters the substrate, and the force experienced in forcing the probe against the substrate quickly increases, as shown by non-linear trace 92, again with a substantial noise component. For these reasons, a threshold 94 corresponding to force $F_T$ is established that is substantially greater than the noise component and the anticipated linear drift. The measurement is usually stopped after the threshold 94 has been encountered, though it is possible to do some short-period averaging before the threshold comparison to reduce noise. Conventionally, the depth of the probe when the force exceeds the threshold $F_T$ is the experimentally determined depth $Z_D$.

If the encountered surface is flat, the ascending portion 92 of the data is much steeper than that indicated so the placement of the threshold 94 is not crucial. However, in the illustrated situation for a sloping sidewall and narrow probe tip, the value of determined depth $Z_D$ depends critically on the placement of the threshold 94.

If the trench bottom 84 is encountered between the two points 80, 82, the error is reduced, but in an unknown fashion because the location of the bottom is not known beforehand. Of course, the error illustrated in FIGS. 5 and 6 can be reduced by decreasing the threshold 94 closer to the linear portion 90, but this expedient would reduce the immunity to electronic and other noise.

Accordingly, it is desired to obtain a more accurate method of determining the height of a feature being measured by a force-sensitive probe, such as when a sloping sidewall is expected.

SUMMARY OF THE INVENTION

The invention may be summarized as a method and associated apparatus for measuring the depth of a microscopic feature with an atomic force microscope or related profilometer, particularly applicable to measuring sloping surfaces with a very narrow probe. The probe tip is sequentially lowered to a plurality of positions, and the force encountered by the probe is measured. When a threshold force has been exceeded, all the data is analyzed and is fit to two curves. One curve corresponds to probe depths before the surface is encountered; the other corresponds to depths after the surface is encountered and quickly increases with depth. The intersection of the two curves is identified with the depth of the feature.

DETAILED DESCRIPTION OF THE PREFERRED EMBODIMENTS

Figure 6:
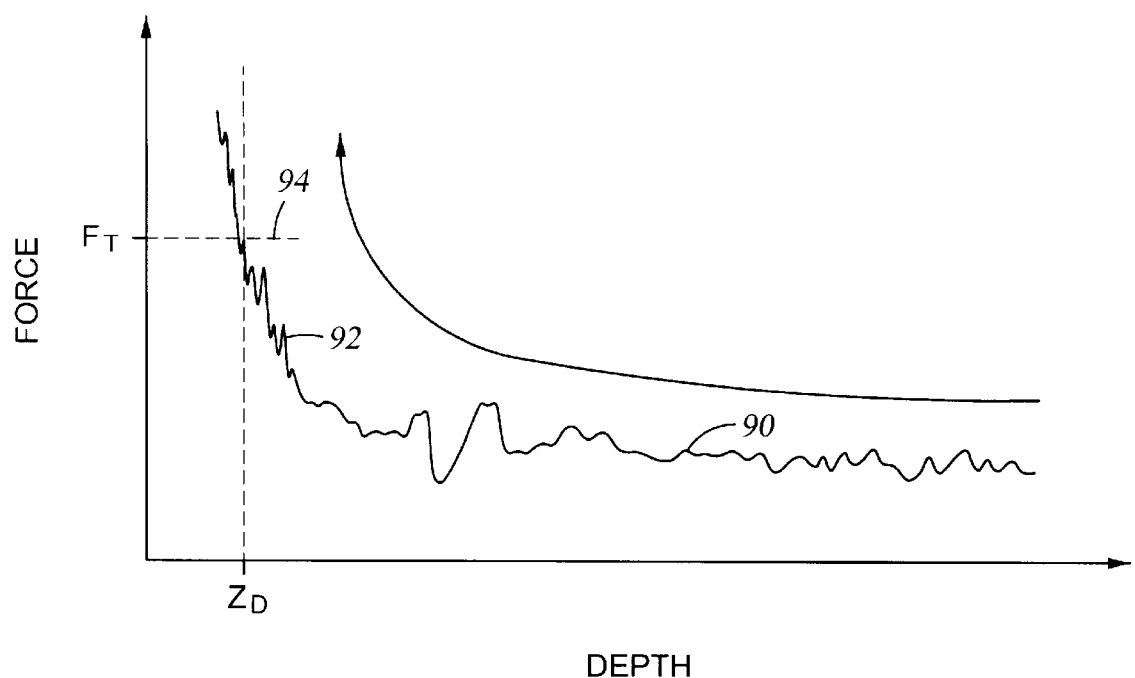
FIG. 6 is a graph of data acquired in by a scanning atomic force microscope and analyzed according to the prior art.

An inspection of FIG. 6 and a consideration of the mechanisms involved show that there are two regions of the trace for force vs. depth. Before the probe tip is encountered, the trace is flat or perhaps linear with depth. After the probe tip encounters the surface, a much sharper dependence of force vs. depth is manifested. The invention utilizes this understanding to fit the experimentally obtained data to two different dependences or curves.

Figure 7:
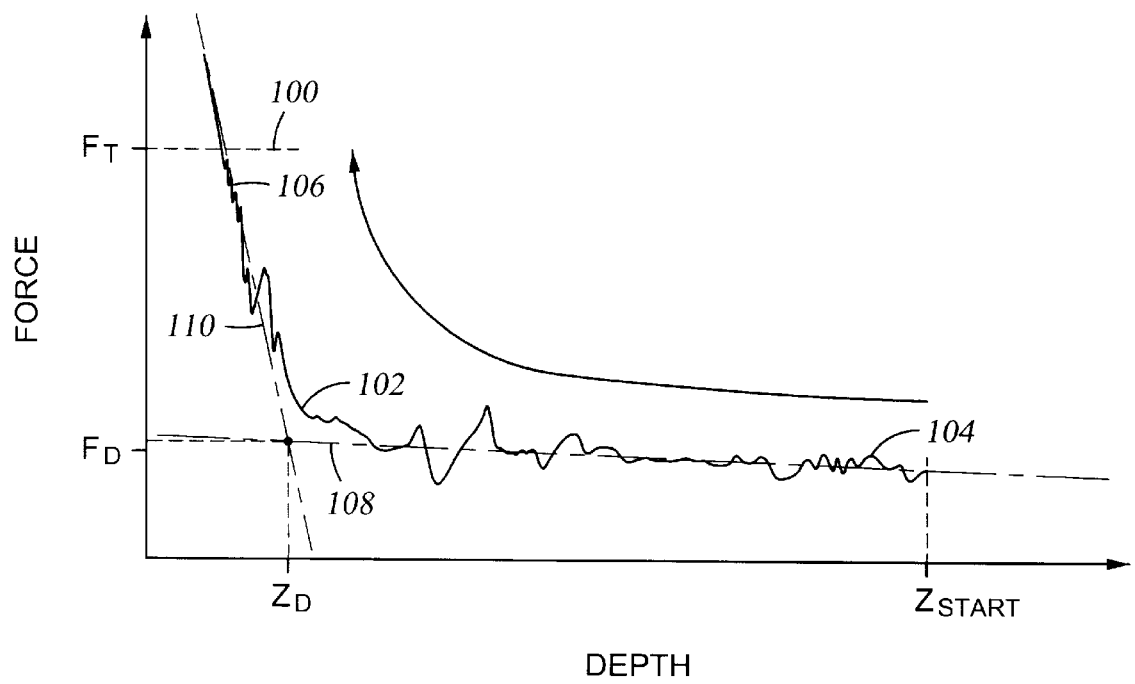
FIG. 7 is a graph, similar to FIG. 6, in which the data is analyzed according to the invention.

One embodiment of the invention will be described with reference to the graph shown in FIG. 7 for data obtained of force vs. depth. Similarly to the prior art, data recording begins at a height (depth) far above the anticipated surface to be encountered. The data is collected and recorded for a series of depths until a force threshold 100 is observed. The threshold 100 need not be that of the prior art since it does not directly determine the experimentally derived depth, but only indicates that further increases in force and associated data recording are not needed and perhaps will damage the probe tip or sample. In the pixel mode, data are collected at a discrete number of points along the scan line, but FIG. 7 represents this as a continuous trace 102 having both a generally flat portion 104 and a sharply ascending portion 106. It is typical to determine the force at 100 to 300 points along a 0.1–1 µm vertical movement.

After the force threshold 100 has been observed, the probe tip is raised for its positioning at a new probe point, and the previously collected data are analyzed. The data along the entire trace 102 are numerically fit to two curves, actually two straight lines 108, 110 in the simple embodiment described here.

Figure 1:
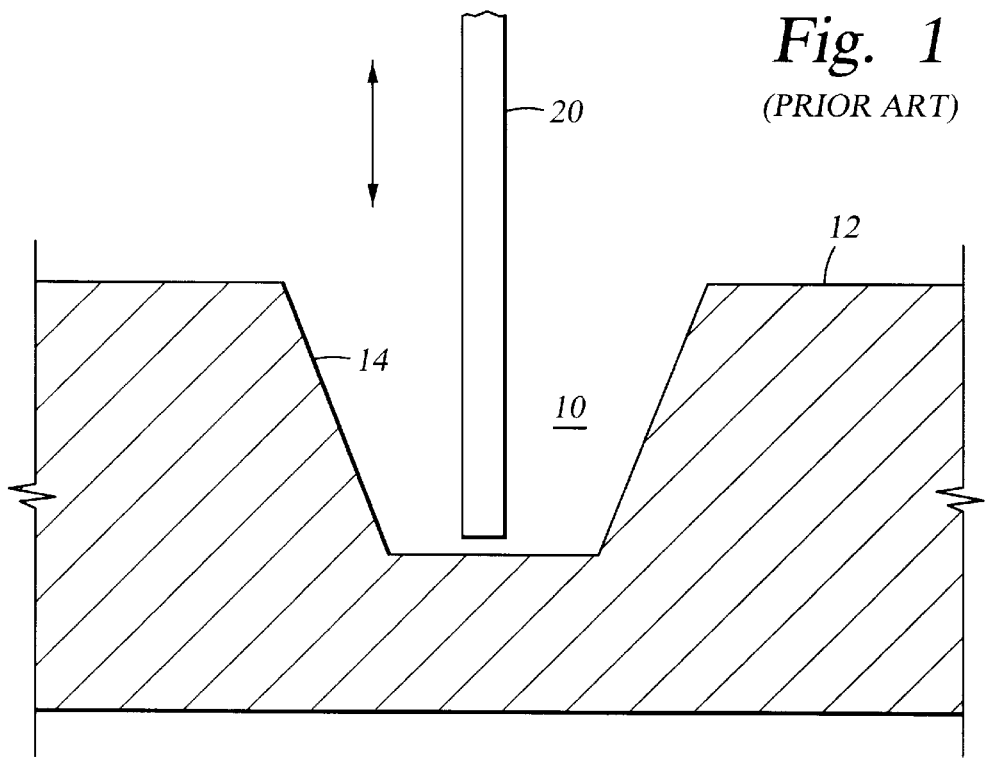
FIG. 1 is a schematic cross-sectional view of a probe for measuring critical dimensions in a silicon wafe.
Figure 2:
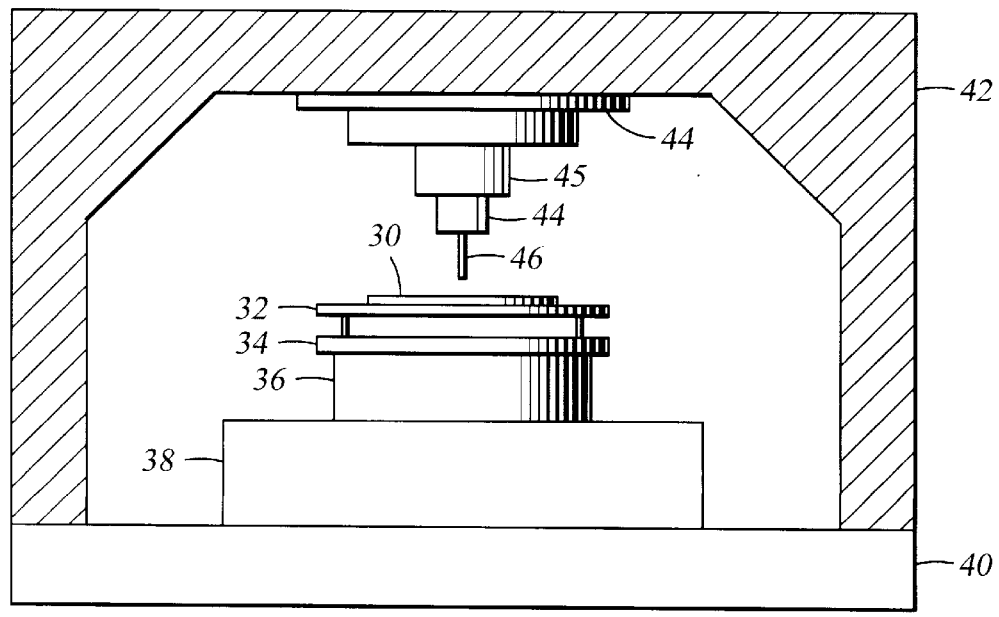
FIG. 2 is a side view of a commercially available atomic force microscope for measuring critical dimensions.
Figure 3:
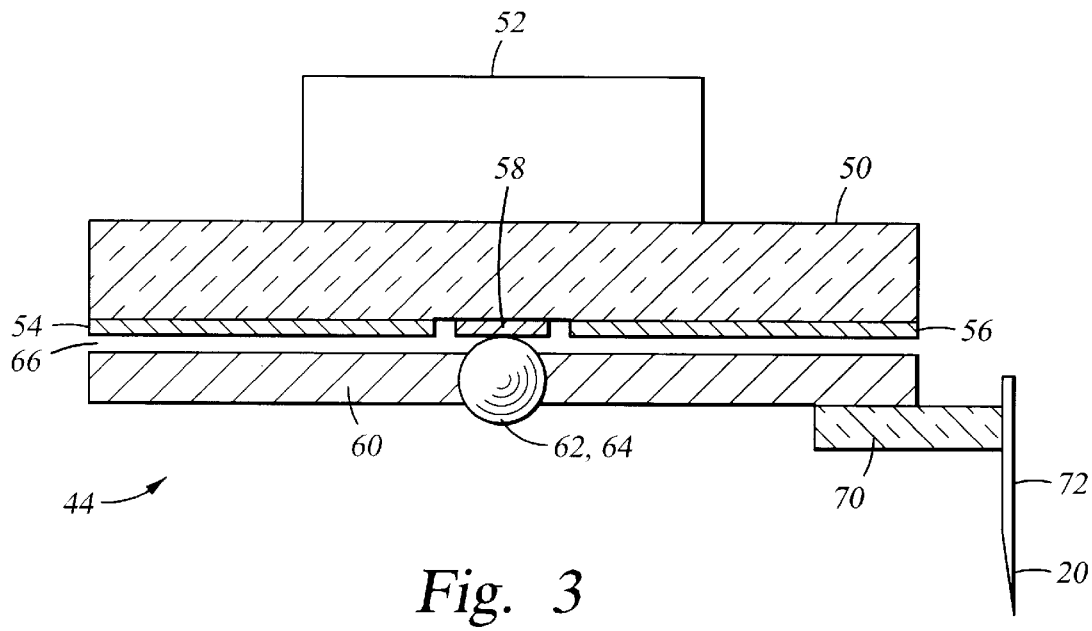
FIGS. 3 and 4 re orthogonal side views of the probe head of the system of FIG. 2.
Figure 4:
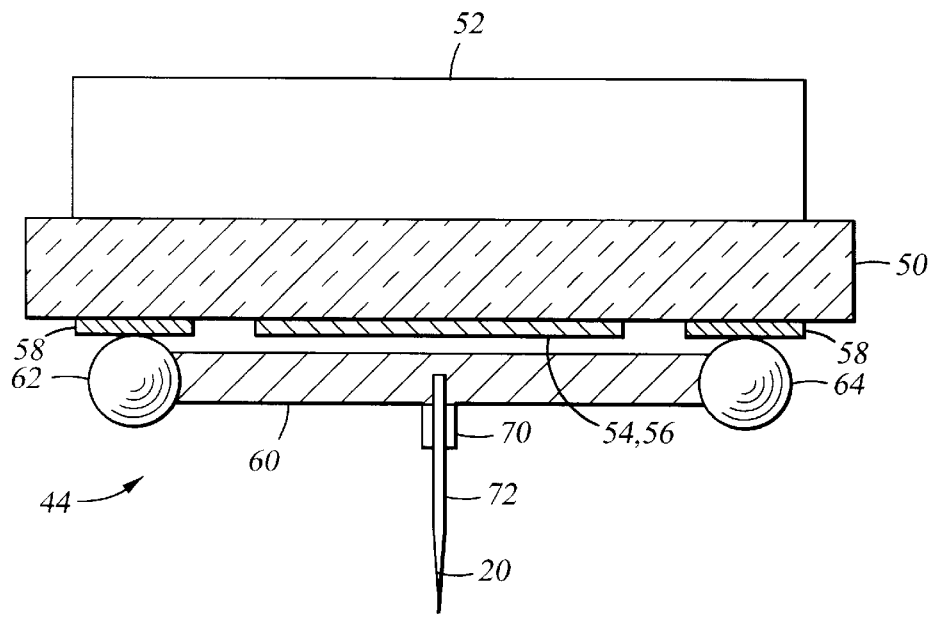
Figure 5:
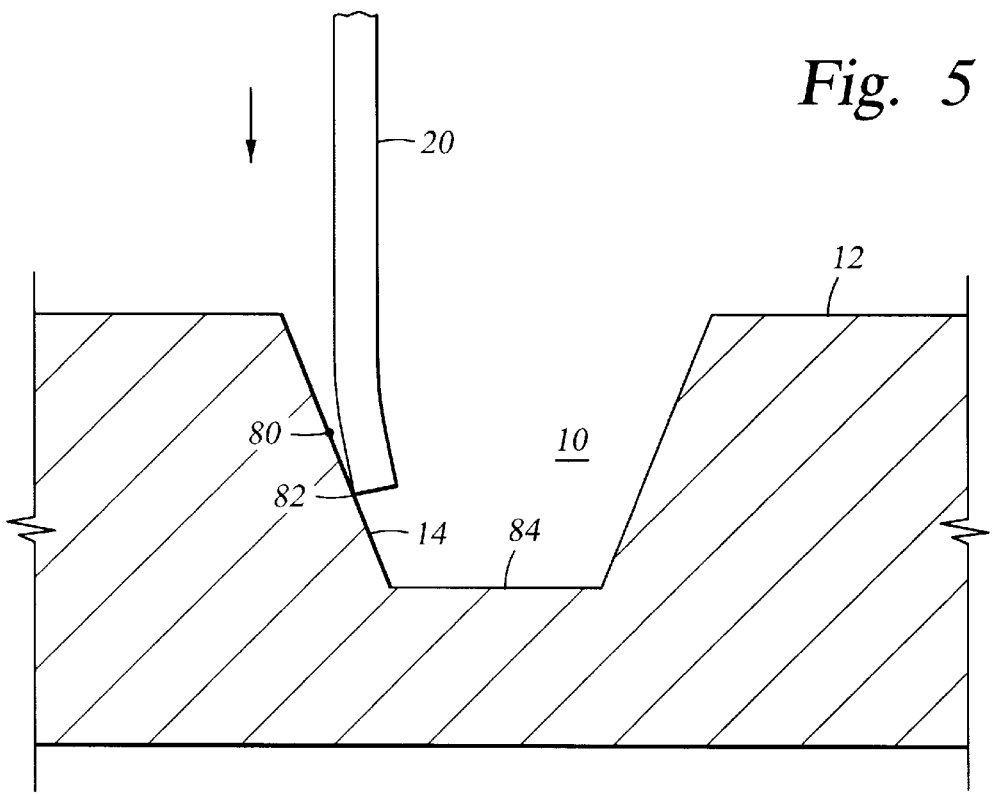
FIG. 5 is a schematic cross-sectional view, similar to FIG. 1, of a probe measuring critical dimensions in a feature having sloping sidewalls.
Figure 8:
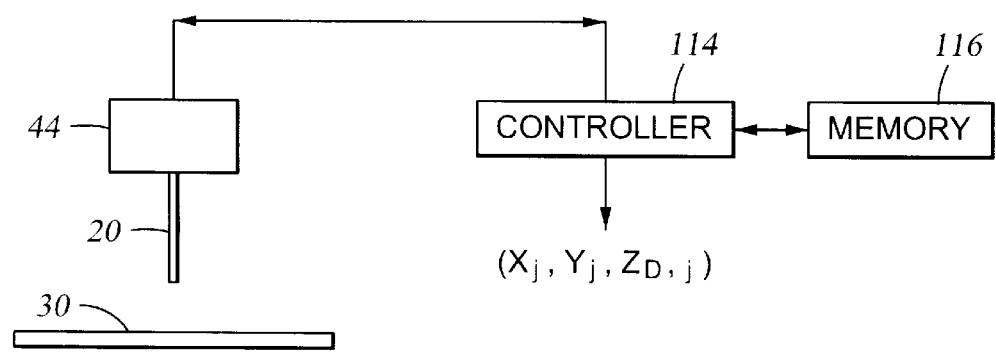
FIG. 8 is a block diagram of an embodiment of an atomic force microscope of the invention.

The invention may be practiced on equipment schematically illustrated in FIG. 8. A computerized controller 114 controls the operation of the pixel model profilometer or atomic force microscope (AFM) by controlling the piezoelectric actuator in the probe head 44 to position the probe tip 22 laterally and then downwardly in discrete steps to the sample 30 being probed. The controller 114 also reads the force encountered by the rocking beam in the probe head 44 in its downward descent.

For each vertical position $z_i$ of the probe tip 20 at a particular lateral position $(x_j, y_j)$, the controller 114 records the vertical position $z_i$ and the force $F_i$ in a memory 116, such as semiconductor random access memory (RAM). Once the force threshold $F_T$ has been exceeded, the controller 114 then analyzes the stored data $\{z_i, F_i\}$ to determine the depth value $z_{D,j}$ at the intersection of two curves fit to the data. The controller 114 records or outputs the vector $(x_j, y_j, z_{D,j})$ as one point of the profile. Alternatively, the memory 116 may be a recordable medium, such as a magnetic disk, and the data may then be analyzed after the completion of the complete scan by a separate computer.

Figure 9:
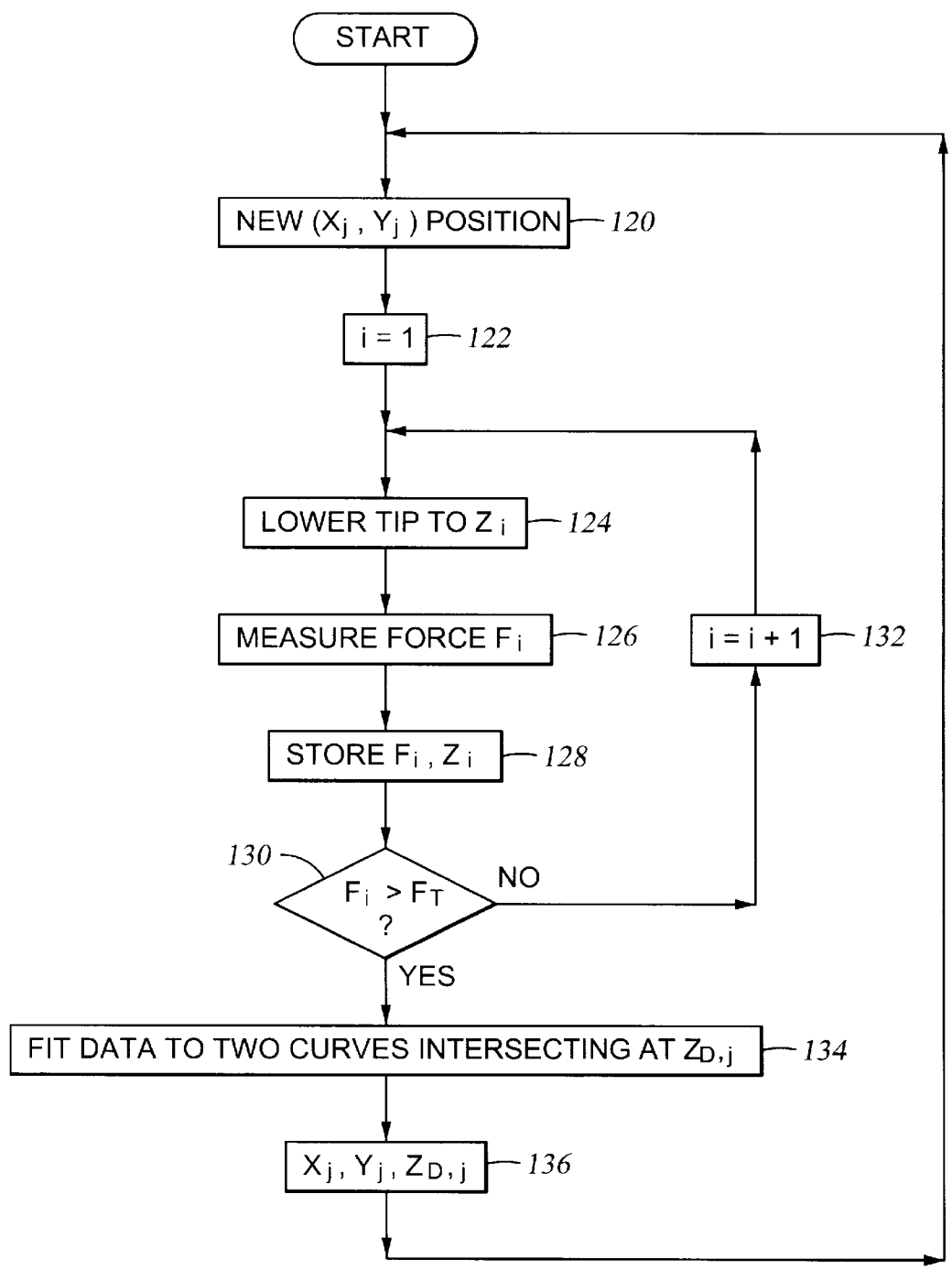
FIG. 9 is a flow diagram of an embodiment of the measuring and analyzing process of the invention.

A sample algorithm for practicing the overall profiling is illustrated in the flow diagram of FIG. 9. The algorithm may be stored in the memory 116 and programmed into the controller 114 already being used for control of the AFM of FIG. 8. According to the exemplary algorithm, in step 120, the probe tip 20 is positioned at a new lateral position $(x_j, y_j)$ with the probe tip 20 positioned at a vertical position $z_{START}$ which is a sufficient distance away from the surface being probed that it does not scrape it during the lateral movement. In step 122, a vertical index i is initialized to one. In step 124, the probe tip is lowered to a depth $z_i$. In practice, there is a fixed increment $\Delta z$ between steps and $z_i$ is represented by the expression $$z_i = z_{START} - i \cdot \Delta z. \tag{1}$$

Step 126 determines the force $F_i$ encountered by the probe tip 20 at its new position and measured by the rocking beam in the probe 44. In step 128, the pair of values or vector $(F_i, z_i)$ is stored as a pair in the memory. In view of the vertical indexing described above, the storage can be accomplished by storing $F_i$ at location i. It typically requires about 16 µs to move the probe downward one increment and to measure the force exerted against the probe tip at that position.

In test 130, the force $F_i$ measured in this step is compared to the force threshold $F_T$. If the force is less than the threshold, the vertical index i is incremented in step 132, and execution returns to step 124 for another depth point. If the force exceeds the threshold, in step 134, the data $\{F_i, z_i\}$ is fit to two curves that intersect at a numerically determined depth $z_{D,j}$. It is understood that the threshold condition may be more complex than a simple comparison. For example, an average of several steps may be thresholded, or several successively measured forces may be required to exceed a threshold.

The profile vector $(x_j, y_j, z_{D,j})$ is recorded or output at step 136 as one point in the profiling. Execution then returns to step 120 for determining the depth at another lateral point, if that is desired.

Returning now to the important curve fitting and with reference to FIG. 7, the first curve or line 108 is associated with the generally flat portion 104 of the depth trace 102 away from the probed surface, and the second line or curve 110 is associated with the sharply ascending portion 106 towards the probed surface. These two lines 108, 110 intersect at the point $(F_D, z_D)$. The portion of the first line 108 for $z \geq z_D$ and the portion of the second line 110 for $z < z_D$ together closely approximate the entire trace 102. In the simplest model, the first line 108 is identically zero since the probe tip has not yet engaged the substrate and the second line 110 is proportional to the depth beyond which the probe has engaged the substrate with the proportionality constant varying with the effective lateral spring constant of the probe tip being deflected laterally and the slope of the sidewall. However, the first line 108 may be offset from zero because of instrumental offset of the measuring circuitry and may additionally vary with depth because of drift. In the case where both lines 108, 110 linearly relate the depth and the force, the entire relationship is represented by two first-order polynomials $$F(z) = \begin{cases} F_D + \alpha_1(z - z_D), & \text{for } z \leq z_D \\ F_D + \alpha_2(z - z_D), & \text{for } z > z_D \end{cases} \tag{2}$$

Of course, the fitting in the depth direction may be performed with use of the vertical index i rather than a physical distance $z = z_i$ if the measurements are taken with a fixed increment $\Delta z$.

The numerical fitting implicitly or explicitly produces four constants in the case of the linear relationships: $F_D$, $z_D$, $\alpha_1$, and $\alpha_2$. According to this embodiment of the invention, the depth determined by the probing is the depth $z_d$ at which the two lines 108, 110 intersect. The other constants $F_D$, $\alpha_1$, and $\alpha_2$ resulting from the curve fitting need not be retained after $z_D$ has been determined.

The details of the curve fitting are not crucial to the concept of the experiment. One method is to utilize linear least squares curve fitting with a range of values for $z_D$. In least squares curve fitting, the sum of the square of the differences between the data and the curves being fit is minimized. Numerical methods for linear least squares are well known for the situation in which a single curve is being fit. Here, two curves separated by the depth value $z_D$ are being fit. The method can be expanded to the two-curve situation by performing the curve fitting for a closely spaced series of values of $z_D$ for both the lower and upper lines 108, 110 and calculating the total squares variation for both line fits for each value of $z_D$. The value of $z_D$ producing the minimum squares deviation is the value determined by the method to be the depth of the feature.

The fitted curves may be more complex than a linear relationship between the force and the vertical displacement. For example, the ascending portion 110 of the trace 102 may have a sub-linear or super-linear component in view of a possibly complex frictional engagement between the probe tip 20 and the sloping sidewall 14, compression of both the probe tip and the substrate, and possible lateral movements of the sample and stage induced by the canted engagement. Thus, a multi-order polynomial fit may be more accurate than a two-term first-order fit, such as in Eqn. (2). In any case, the curves are describable in terms of unknown parameters and experimentally derived data, at least one set of which is related to a force and another to depth. The profile depth can be derived from one or more of the parameters.

It is appreciated that the invention may be practiced on other types of profilometers that include the capability of measuring directly or indirectly the force of engagement between a probe and sample.

The invention thus allows for significantly increased accuracy in determining the depth of a feature, particularly one having a sloping surface. Nonetheless, the increase in accuracy may be accomplished with the addition of some straightforward software to preexisting hardware and computerized controller.

What is claimed is:

1. A method of determining the depth of a feature, comprising the steps of:

lowering a probe tip toward a surface in a plurality of vertical increments, whereby said probe tip is substantially stationary at a plurality of vertical positions;

determining for each of said vertical positions a corresponding force value experienced by said probe tip, whereby a plurality of force values are determined;

comparing each of said force values to a threshold force; and after said probe tip has encountered said surface, fitting said plurality of force values to two curves, a first of said curves being associated with said vertical positions when said probe tip is nearer said surface and a second of said curves being associated with said vertical positions when said probe tip is farther from said surface, wherein said fitting is performed when at least one of said force values exceeds said threshold force.

2. A method of measuring the height of a feature in a substrate, comprising the steps of:

a) positioning a probe tip above a surface of the substrate;

b) moving the probe tip a predetermined distance along a first direction toward said surface to dispose said probe tip at selected one of a plurality of vertical positions;

c) measuring a force experienced by said probe tip along said first direction while said probe tip is disposed at said selected one of said plurality of vertical positions;

d) if said force does not exceed a threshold condition, repeating steps b), c), and d);

f) if said force exceeds said threshold condition, fitting said forces measured at said plurality of vertical positions to at least one parametric relationship relating said forces to said plurality of vertical positions; and e) identifying a height of said surface from at least one parameter of said at least one parametric relationship.

3. The method of claim 2, wherein said at least parametric relationship comprises two parametric relationships, a first of said relationships corresponding to those of said vertical positions further away from said surface and a second of said relationships corresponding to those of said vertical positions closer to said surface.

4. The method of claim 3, wherein said height of said surface is identified from parameters of said first and second relationships.

5. The method of claim 3, wherein said height is identified with an intersection of curves represented by said relationships in coordinates of said position along said first direction and said force.

6. An atomic force microscope, comprising:

a probe tip;

an actuator capable of positioning said probe tip at a plurality of successive vertical positions along a first direction toward and substantially perpendicular to a surface being probed while said probe tip is substantially horizontally stationary at a horizontal position within a plane of said surface;

measuring apparatus measuring a force exerted on said probe tip along said first direction;

a memory recordable with a plurality of first values of said force and associating said first values with corresponding second values of said vertical positions at which said force was measured; and calculating means fitting said first values of said force and said second values of said vertical position to at least one parametric relationship between said force and said vertical position and deriving a height of said surface from said at least one relationship fitted with said first and second values.

7. The microscope of claim 6, wherein said calculating means fits said values to two parametric relationships, a first of said relationships associated with those of said vertical positions further from said surface and a second of said relationships associated with those of said vertical positions farther from said surface.

8. The atomic force microscope of claim 7, wherein said two relationships are representable by curves in coordinates of said force and said vertical position and said calculating means calculates a value of said vertical position at which said curves intersect.

9. The atomic force microscope of claim 6, further comprising sequencing means controlling said actuator to position said probe tip at said sequence of vertical positions successively closer to said surface.

10. An atomic force microscopes, comprising a probe tip;

an actuator capable of positioning said probe tip at a plurality of positions along a first direction intersecting a surface being probed;

sequencing means controlling said actuator to position said probe tip at said sequence of positions successively closer to said surface;

measuring apparatus measuring a force exerted on said probe tip along said first direction;

a memory recordable with a plurality of values of said force and associating said values with corresponding values of said positions at which said force was measured; and calculating means fitting said values of said force to at least one parametric relationship between said force and said position, a height of said surface being derivable from said at least one relationship fitted with said values, wherein said calculating means fits said values to two parametric relationships, a first of said relationships associated with those of said positions farther from said surface and a second of said relationships associated with those of said positions further from said surface, and wherein said two relationships are representable by curves in coordinates of said force and said position and said calculating means calculates a value of said position at which said curves intersect;

thresholding means comparing said measured force with a threshold force condition, at least one output of said thresholding means interrupting an operation of said sequencing means and initiating an operation of said calculating means.

11. The microscope of claim 6, where said first and second values are accumulated during a motion of said probe tip toward said surface and not away from said surface.

12. The microscope of claim 6, comprising a,balance beam mounting said probe tip and electrical means for balancing said balance beam.

* * * * *